United States Patent
Chang

(10) Patent No.: US 6,401,135 B1
(45) Date of Patent: *Jun. 4, 2002

(54) TRANSLATOR OBJECT FOR TESTING AN INTERFACE TO A SERVER OBJECT

(75) Inventor: April S. Chang, Los Altos, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/669,006

(22) Filed: Jun. 21, 1996

(51) Int. Cl.⁷ .............................................. G06F 15/163
(52) U.S. Cl. ...................... 709/311; 709/313; 709/315
(58) Field of Search ................................ 709/315, 313, 709/310, 311; 714/25; 706/47

(56) References Cited

U.S. PATENT DOCUMENTS

| | | | | |
|---|---|---|---|---|
| 4,617,663 A | * | 10/1986 | Lake et al. | 371/25 |
| 5,218,605 A | * | 6/1993 | Low | 371/16.1 |
| 5,390,325 A | * | 2/1995 | Miller | 395/575 |
| 5,481,721 A | * | 1/1996 | Serlet et al. | 395/683 |
| 5,485,617 A | * | 1/1996 | Stutz et al. | 395/683 |
| 5,615,333 A | * | 3/1997 | Juettner | 395/183.14 |
| 5,715,373 A | * | 2/1998 | Desgrousillers et al. | 706/47 |
| 5,751,941 A | * | 5/1998 | Hinds et al. | 395/183.14 |

OTHER PUBLICATIONS

OMG, Common Object Request Broker: Architecture and Specification, pp. 13–14, 105–122, Dec. 1991.*
Brando, Thomas; "Interoperability and the CORBA Specification" Feb. 1995.*
OMG; "Common Object Request Broker: Architecture & Specification" Chaps. 2, 4, 12; Jul. 1995.*
OMG TC Document 94.3.1, "ORB 2.0 RFP Submission: ORB Interoperability", Mar. 7, 1994.*
"The Common Object Request Broker: Architecture & Specification", Review 2.0, Jul. 1995.*

* cited by examiner

Primary Examiner—Viet D. Vu
(74) Attorney, Agent, or Firm—Townsend and Townsend and Crew LLP

(57) ABSTRACT

Systems and methods for testing interfaces to a server object are provided. A translator object is placed between a client object and the server object for which the interface is to be tested. The client and server objects communicate utilizing tested interfaces, however, the translator object communicates requests between the two utilizing the interface under test. In this manner, an existing test suite for static interfaces may be utilized to test dynamic interfaces without requiring that a new test suite be developed.

16 Claims, 5 Drawing Sheets

TRANSLATOR OBJECT FOR TESTING AN INTERFACE TO A SERVER OBJECT

BACKGROUND OF THE INVENTION

The present invention is related to object-oriented computer systems and, more particularly, to a translator object for testing an interface to a server object.

As individual computer systems increasingly become more powerful and complex, the integration of these heterogeneous computer systems becomes a very desirable yet difficult task. Users' expectations for interoperability have increased dramatically due to the availability of highly interoperable platforms such as UNIX, Microsoft Windows and Apple Macintosh. Unfortunately, vendor-specific solutions for integrating heterogeneous computer systems have generally been unsatisfactory. This is especially true because vendor-specific solutions require upgrades to take into account new product releases.

The Object Management Group (OMG) has promulgated standards for nonvendor-specific solutions for heterogeneous systems integration. At the heart of OMG's standard is the Common Object Request Broker Architecture (CORBA). CORBA is a distributed environment defined using object-oriented concepts to hide all differences between programming languages, operating systems, hardware platforms, and object location. This interoperability is achieved through well-defined interface specifications at the application level.

Well-defined protocols exist for allowing systems to communicate by agreeing to certain standards that will be used. The Open Systems Interconnection (OSI) seven layer model is possibly the most widespread of these protocols. The lowest layer, the Physical layer, describes how the physical network is accessed. The Data Link layer provides reliable transmission across a physical link. The Network layer deals with connection establishment and routing. The Transport layer provides reliable end-to-end transmission. The Session layer is concerned with connection control. The Presentation layer deals with data syntax and transparency to the applications. Lastly, the upper layer, the Application layer, describes end-user functionality. Conceptually, CORBA resides in the Application layer.

A central component of CORBA is the Object Request Broker (ORB) which is the infrastructure for providing transparent distributed communication across heterogeneous systems. The CORBA specification describes all the standard interfaces for ORBS. The Basic Object Adapter (BOA) is an initial set of ORB interfaces for object implementations.

CORBA is a peer-to-peer distributed computer facility where all applications are objects. Objects can alternate between being a client and a server, where a client object is defined as being the originator of an object invocation and a server object is defined as being the recipient of an object invocation. Server objects are also referred to as object implementations. Typically, objects play both roles at one time or another.

CORBA provides two mechanisms with or through which applications-may communicate: static interfaces and dynamic interfaces. In static interfaces, the parameters are defined at compile-time whereas in dynamic interfaces, the parameters are defined at run-time.

Static interfaces include a stub and a skeleton. The client object links to the stub so that from the client's perspective, the stub acts like a local function call. Transparently, the stub provides an interface to the ORB that encodes and decodes the specified operation's parameters into communication formats suitable for transmission. The skeleton is the corresponding server-side implementation of the interface. When the server object completes processing of the request, the skeleton and stub return the results to the client, along with any exceptions that are generated by either the server or the ORB.

Dynamic interfaces are an alternative to compiled static interfaces. Dynamic interfaces include a Dynamic Invocation Interface (DII) and a Dynamic Skeleton Interface (DSI). The DII is a generic facility for invoking any operation with a run-time-defined parameter list. A run-time interface description of the operation signature specifying the parameter list is retrieved during run-time. Thus, a request can be constructed to previously unknown operation or object type. The DSI is the corresponding server-side implementation of the interface. Use of the dynamic interface instead of the static interface is transparent to object implementation.

It has been estimated that the majority of applications utilize static interfaces. As a result, oftentimes, a test suite has already been developed to test the static interfaces to a server object. Developing test suites is a time consuming process so it would be desirable to provide more efficient systems and methods for testing interfaces.

SUMMARY OF THE INVENTION

Embodiments of the present invention provide innovative systems and methods for testing interfaces to a server object. The present invention may utilize an existing test suite for static interfaces to test dynamic interfaces without requiring that a new test suite be developed. A translator object is placed between a client object (e.g., executing the test suite) and the server object for which the dynamic interface is to be tested. The client and server objects communicate utilizing the static interfaces, however, the translator object communicates requests between the two utilizing the dynamic interface, thereby testing the dynamic interface.

In one embodiment, the present invention provides a method of testing a particular interface to a server object in a computer system, comprising the steps of: sending a request with a tested interface to a translator object; the translator object receiving the request with the particular interface; the translator object sending the request with the particular interface to the server object; and the server object receiving the request with the tested interface. The tested interface may be static and the particular interface to be tested may be dynamic.

In another embodiment, the present invention provides a system for testing a particular interface to a server object, comprising: a client object that sends requests with a tested interface; a translator object that receives the requests with the particular interface from the client object and sends the requests in the particular interface; a server object that receives the requests with the tested interface from the translator object; and a transfer medium that connects the client object, translator object and server object. The tested interface may be static and the particular interface to be tested may be dynamic.

Other features and advantages of the present invention will become apparent upon a perusal of the remaining portions of the specification and drawings.

DETAILED DESCRIPTION OF PREFERRED EMBODIMENTS

In the description that follows, the present invention will be described in reference to a Sun workstation running under the Solaris operating system. The present invention, however, is not limited to any particular computer architecture or operating system. Therefore, the description of the embodiments that follow is for purposes of illustration and not limitation.

Figure 1:
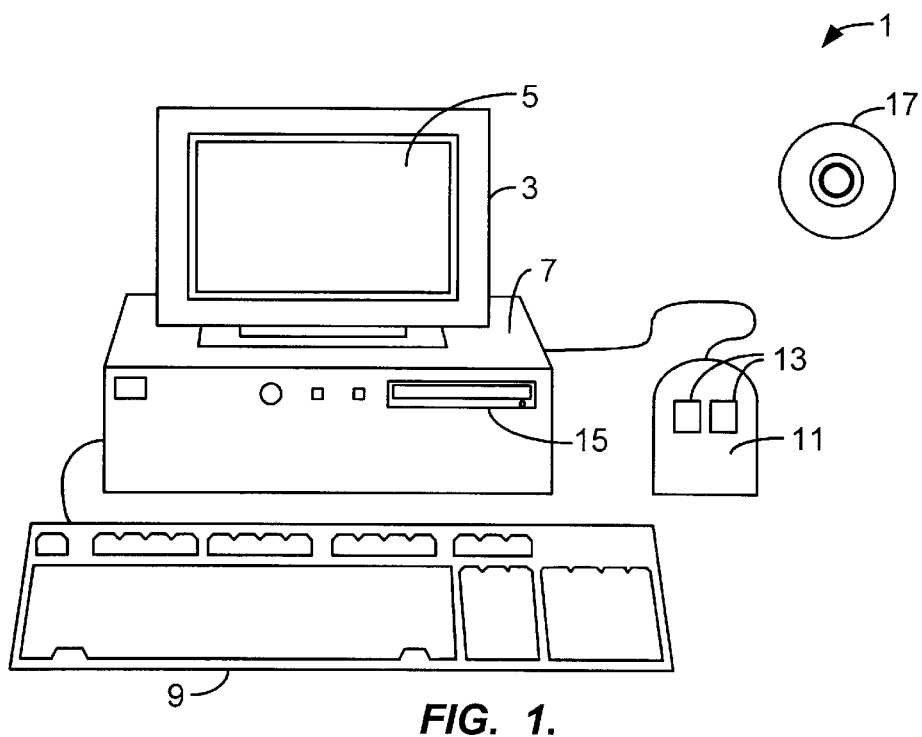
FIG. 1 illustrates an example of a computer system used to execute the software of an embodiment of the present invention.

FIG. 1 illustrates an example of a computer system used to execute the software of an embodiment of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15, a system memory and a hard drive (see FIG. 2) which may be utilized to store and retrieve software programs incorporating code that implements the present invention, data for use with the present invention, and the like. Although a CD-ROM 17 is shown as an exemplary computer readable storage medium, other computer readable storage media including floppy disks, tape, flash memory, system memory, and hard drives may be utilized. Cabinet 7 also houses familiar computer components (not shown) such as a central processor, system memory, hard disk, and the like.

Figure 2:
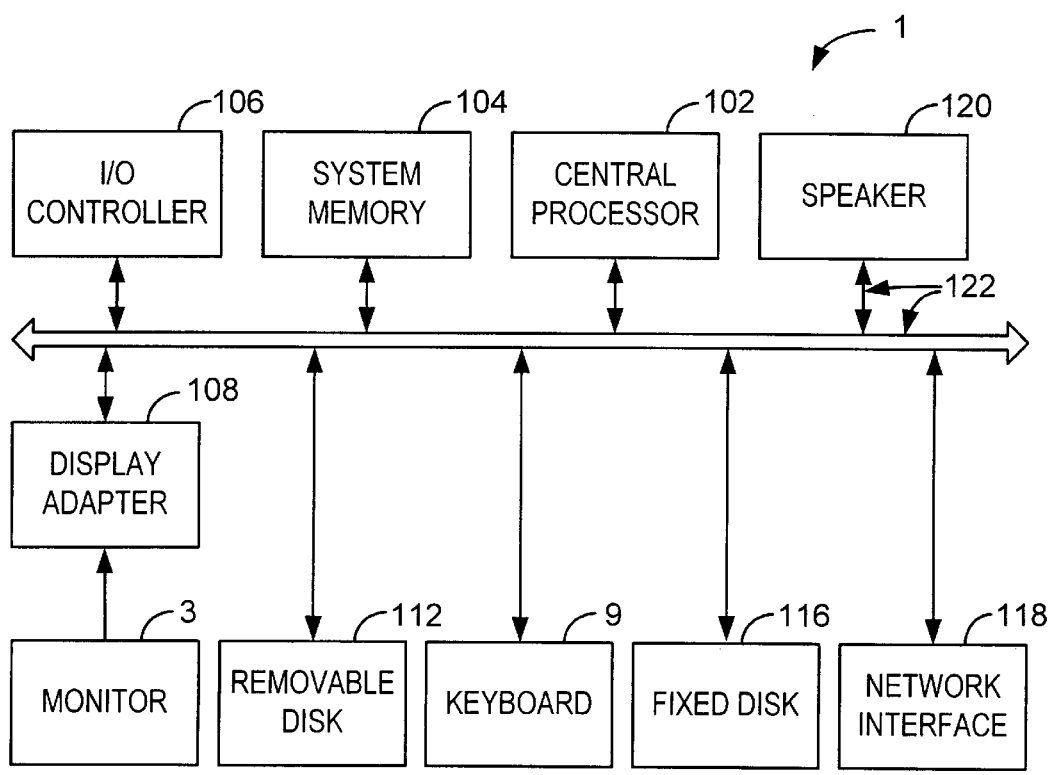
FIG. 2 shows a system block diagram of a typical computer system used to execute the software of an embodiment of the present invention.

FIG. 2 shows a system block diagram of computer system 1 used to execute the software of an embodiment of the present invention. As in FIG. 1, computer system 1 includes monitor 3 and keyboard 9. Computer system 1 further includes subsystems such as a central processor 102, system memory 104, I/O controller 106, display adapter 108, removable disk 112 (e.g., CD-ROM drive), fixed disk 116 (e.g., hard drive), network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
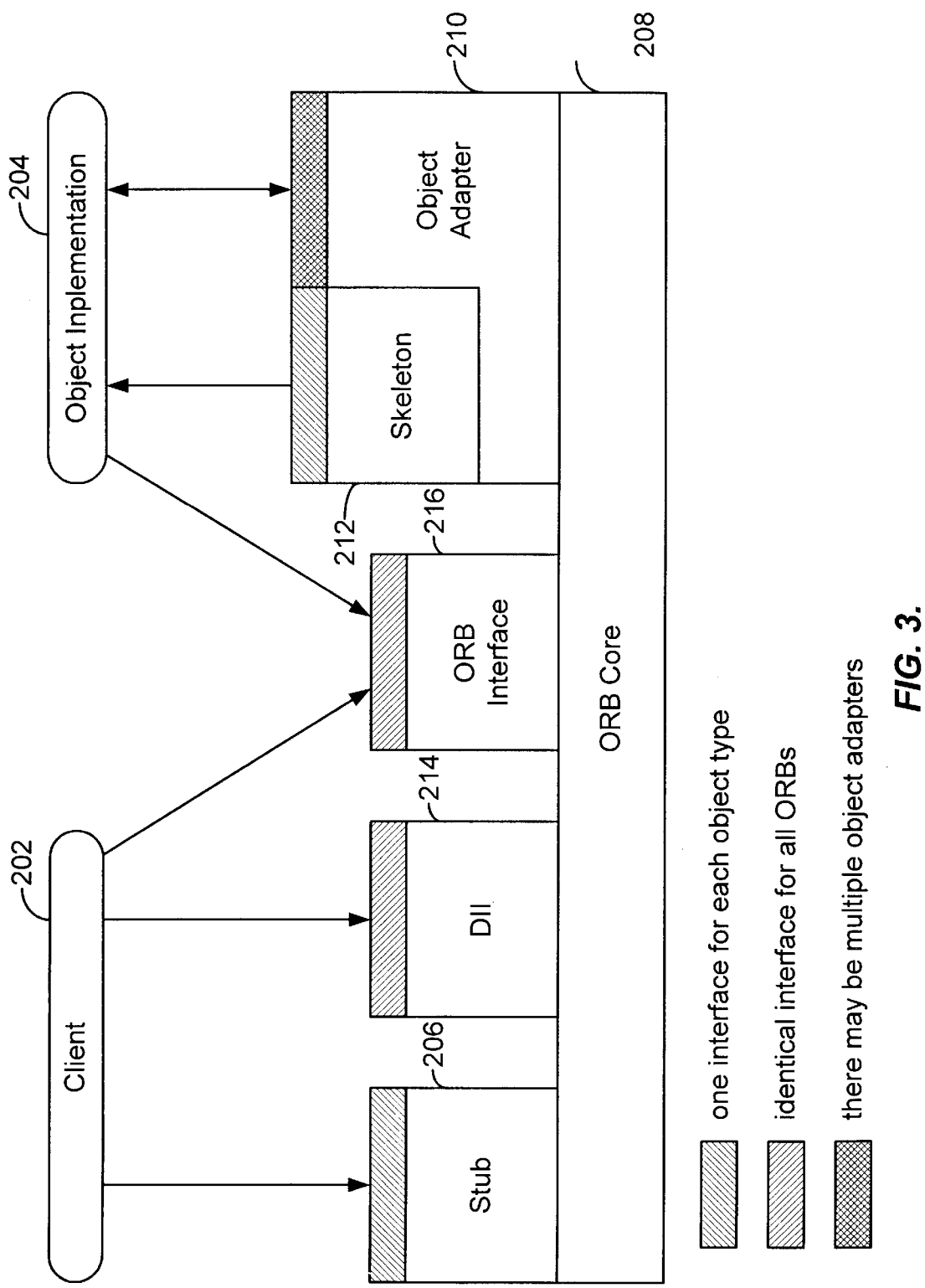
FIG. 3 is a block diagram of the interfaces between CORBA objects.

FIG. 3 is a block diagram of the static and dynamic interfaces between objects in CORBA. A client object 202 makes requests to an object implementation 204 (also called a "server object" as it services client requests). The terms client and server are relative terms. A client may be a client with respect to a specific request and a server with respect to another request. Consequently, these labels will vary according to the circumstances.

A client may also make a request utilizing a dynamic interface by calling a DII 214. The DII provides an interface to ORB core 208 that encodes and decodes the specified operation's parameters into communication formats suitable for transmission over the transfer medium. The DII is dynamic because the parameter list is defined at run-time.

After a request is encoded and transmitted over the transfer medium, the request is decoded and passed to object adapter 210. If the specified object implementation utilizes a dynamic interface, skeleton 212 (DSI in this case) provides a callback to a function implementation for the request. The client and server object may also interact directly with the ORB core through an ORB interface 216. For example, the client or server may query the ORB for parameter type information for an interface to an object.

It should be noted that the format of the request is the same over the transfer medium regardless of whether a static or dynamic interface is utilized. Although the preceding has described both the client and server as utilizing the same interface for simplicity, an aspect of embodiments of the present invention take advantage of the flexibility CORBA allows in that each object specifies which interface will be utilized for a request.

Figure 4:
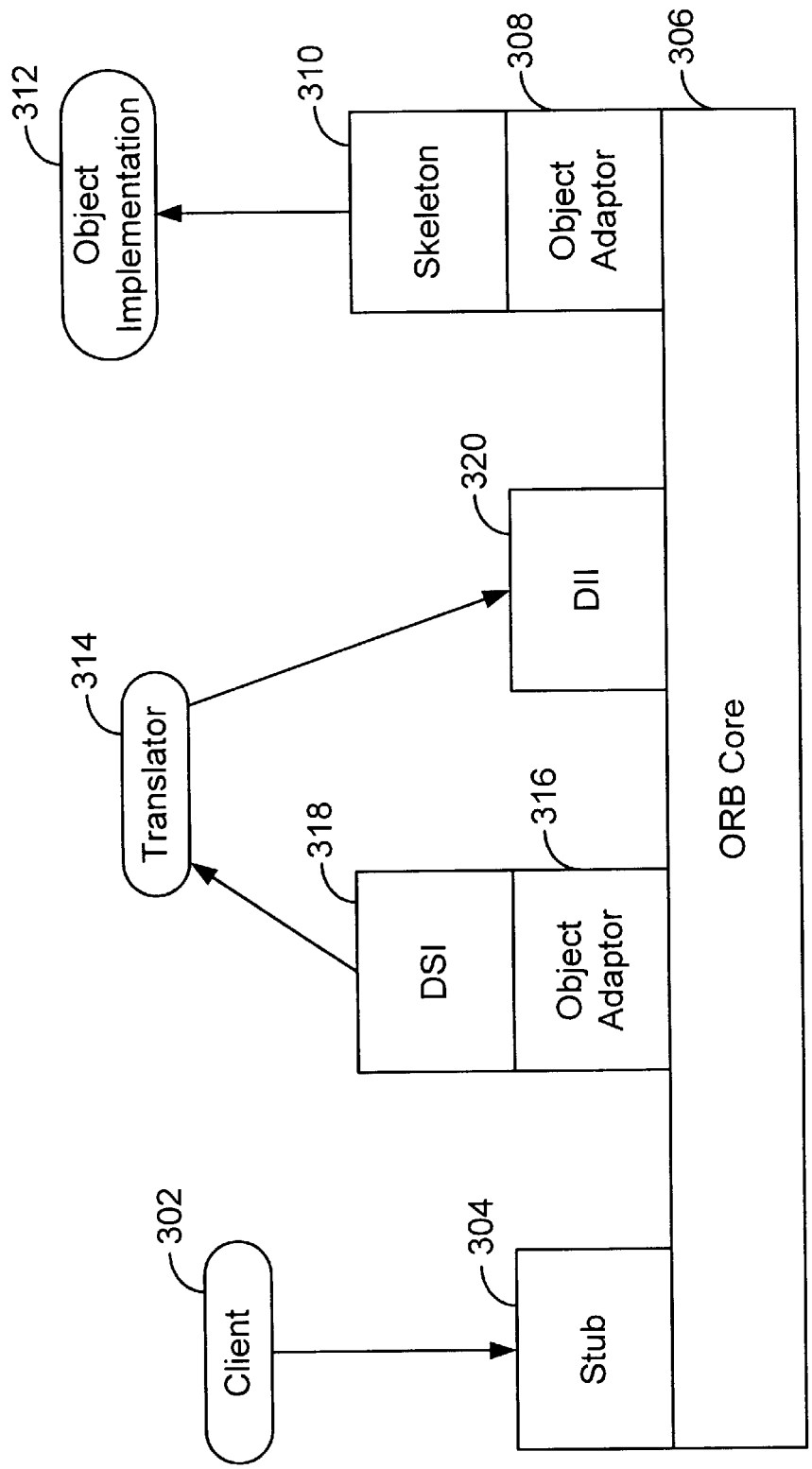
FIG. 4 is a block diagram of the translator object receiving requests from a client object and sending the requests to a server object.

FIG. 4 is a block diagram of the translator object of the present invention receiving requests from a client object and sending the requests to a server object. For illustrative purposes, assume that a test suite already exists for testing static interfaces to a server object. Under this test suite, a client object 302 would make a request through a stub 304. An ORB core 306 would transmit, including decoding and encoding to communicate over the transfer medium, the request to an object adapter 308. The object adapter would utilize a skeleton 310 to send the request to an object implementation 312 (server object).

With embodiments of the present invention, a translator object is placed conceptually between the client and server objects. The translator object utilizes the interface under test, which as shown in FIG. 4 is the dynamic interface. The request from the client is directed by an object adapter 316 into a DSI 318. Thus, the translator object receives the request through the dynamic interface. The translator object then translates the request into a DII 320 which the ORB core will direct to the server object.

As shown, the client and server objects still communicate using the tested static interface. However, the translator object utilizes the dynamic interface so that the interface can be tested without developing a new test suite specifically for the dynamic interface.

Figure 5:
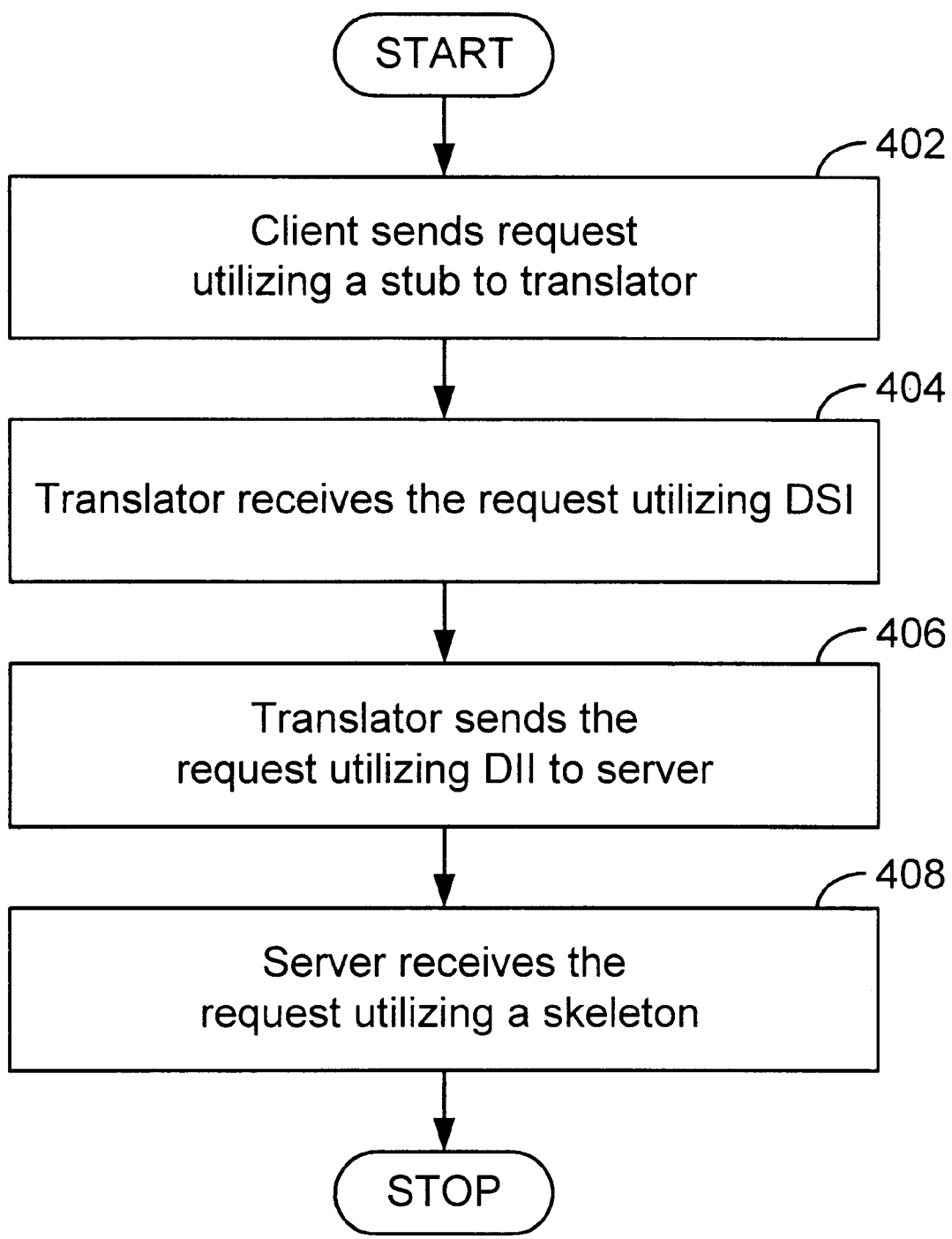
FIG. 5 is a high level flowchart of a process of utilizing a translator object to test a dynamic interface.

FIG. 5 is a high level flowchart of a process of utilizing a translator object to test a DSI. At step 402, the client object sends a request utilizing a static stub to the translator object. An ORB handles the communication of the request to the translator object.

The translator object receives the request utilizing DSI at step 404. The ORB translates the static request into the DSI format as specified by the translator object.

At step 406, the translator object formats the request and sends the request utilizing DII to the server object. The formatting of the DII request involves determining the dynamic argument list for the DII request. This process is described in more detail in reference to FIG. 6.

The server object receives the request utilizing the static skeleton. The ORB translates the dynamic request into the static format as specified by the server object.

Figure 6:
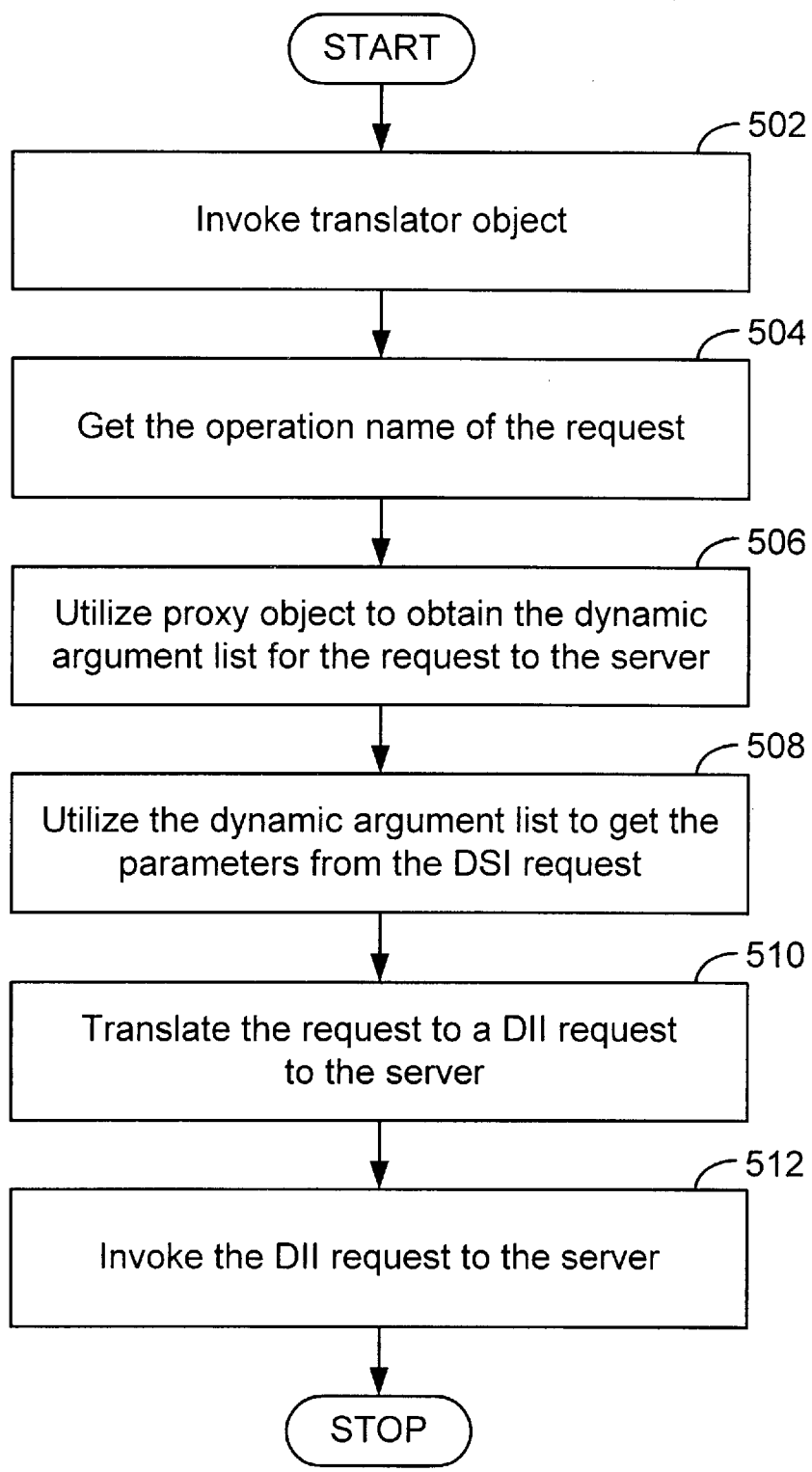
FIG. 6 is a flowchart of a process performed by the translator object.

FIG. 6 is a flowchart of a process performed by the translator object for testing the dynamic interface. At step 502, the translator object is invoked. The translator object is invoked by the object adaptor in response to the receipt of a request that specifies the translator object.

The translator object retrieves the operation name of the request at step 504. At step 506, the translator object utilizes a proxy object to obtain the dynamic argument list for the request to the server object. A proxy object is utilized because, contrary to static interfaces, the argument list is not defined until run-time.

The translator object utilizes the dynamic argument list to get the parameters from the DSI request at step 508. Once the translator object knows the arguments (or parameters) that the server object expects, the translator object is able to extract the arguments from the DSI request.

At step 510, the translator object translates the received request into a DII request to the server object. Once the translator object has formed the DII request, the DII request is sent (or invoked) to the server object.

While the above is a complete description of the preferred embodiments of the invention, various alternatives, modifications and equivalents may be used. It should be evident that the present invention is equally applicable by making appropriate modifications to the embodiments described above. For example, embodiments have been described for testing dynamic interfaces in CORBA objects. However, the invention may be utilized to test static interfaces and interfaces in other architectures. Therefore, the above description should not be taken as limiting the scope of the invention which is defined by the metes and bounds of the appended claims along with their full scope of equivalents.

What is claimed is:

1. In a computer system, a method of testing a particular interface to a server object, comprising the steps of:

sending a request with a tested interface, wherein the tested interface is different from the particular interface;

if the request specifies a translator object,
    invoking the translator object for receiving the request with the particular interface, and
    forwarding the request with the particular interface from the translator object to the server object; and receiving the request with the tested interface by the server object, wherein the sending and receiving are performed via a common object request broker (ORB).

2. The method of claim 1, further comprising:

the translator object utilizing a proxy object to obtain a dynamic argument list for the request.

3. The method of claim 2, further comprising:

the translator object utilizing the dynamic argument list to format the request to the server object.

4. The method of claim 1, wherein the tested interface is a static interface in CORBA.

5. The method of claim 1, wherein the particular interface is a dynamic interface in CORBA.

6. In a computer system, a method of testing a dynamic interface to a server object, comprising:

sending a request with a static interface;

if the request specifies a translator object,
    invoking a translator object for receiving the request with the dynamic interface;
    forwarding the request with the dynamic interface from the translator object to the server object; and receiving the request with the static interface by the server object, wherein the sending and receiving are performed via a common object request broker (ORB).

7. The method of claim 6, further comprising:

the translator object utilizing a proxy object to obtain a dynamic argument list for the request.

8. The method of claim 7, further comprising:

the translator object utilizing the dynamic argument list to format the request to the server object.

9. The method of claim 6, wherein the static interface includes a stub and skeleton as specified by CORBA.

10. The method of claim 6, wherein the dynamic interface comprises DII and DSI as specified by CORBA.

11. A system for testing a particular interface to a server object, comprising:

a client object that sends requests with a tested interface;

a translator object that, when specified by the requests, receives the requests with the particular interface from the client object and sends the requests in the particular interface;

a server object that receives the requests with the tested interface from the translator object; and a common transfer medium that couples the client object, the translator object, and the server object.

12. The system of claim 11, further comprising:

an ORB core interposed in the transfer medium for providing transparent distributed communication across heterogeneous systems.

13. A system for testing a particular interface to a server object, comprising:

a client object that sends requests with a static interface;

a translator object that, when specified by the requests, receives the requests with the dynamic interface from the client object and sends the requests in the dynamic interface;

a server object that receives the requests with the static interface from the translator object; and a common transfer medium that couples the client object, the translator object, and the server object.

14. The system of claim 13, further comprising an ORB core interposed in the transfer medium for providing transparent distributed communication across heterogeneous systems.

15. The method of claim 1 wherein the request received by the translator object is in DSI format.

16. The method of claim 1 wherein the request: from the translator object is formatted and sent utilizing DII format.

* * * * *